(12) United States Patent
Clark

(10) Patent No.: US 7,370,830 B2
(45) Date of Patent: May 13, 2008

(54) SYSTEM AND METHOD FOR LANDING A TAILLESS AIRCRAFT IN A CROSSWIND

(75) Inventor: Walter Dennis Clark, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 391 days.

(21) Appl. No.: 11/159,472

(22) Filed: Jun. 23, 2005

(65) Prior Publication Data

US 2008/0017753 A1    Jan. 24, 2008

(51) Int. Cl.
*B64C 25/00* (2006.01)
(52) U.S. Cl. .................................. 244/81; 244/100 R
(58) Field of Classification Search ................ 244/50, 244/51, 100 R, 103 R, 103 W, 36, 81
See application file for complete search history.

(56) References Cited

U.S. PATENT DOCUMENTS

| 2,762,006 | A | * | 9/1956 | Blanchard | 318/587 |
| 2,938,685 | A | * | 5/1960 | Durst | 244/103 R |
| 5,257,756 | A | * | 11/1993 | Patzig et al. | 244/103 R |
| 5,513,821 | A |   | 5/1996 | Ralph | 244/103 |
| 6,722,610 | B1 | * | 4/2004 | Rawdon et al. | 244/103 W |

FOREIGN PATENT DOCUMENTS

GB        879.276        10/1961

\* cited by examiner

*Primary Examiner*—Rob Swiatek
(74) *Attorney, Agent, or Firm*—Stetina Brunda Garred & Brucker

(57) ABSTRACT

The method of landing a flying wing type aircraft in a crosswind includes the steps of disengaging the nose landing wheel upon impact with the runway so that it is free to castor; and thereafter, engaging the nose wheel after a specific time period after the nose wheel impacts the runway such that the nose wheel is steerable. The system for landing a flying wing type aircraft in a crosswind on a runway includes a steering system for steering the nose wheel, the steering system having a first condition wherein it controls the angular position of nose wheel and a second condition wherein the wheel is free to castor. A control system moves the steering system from the first condition to the second condition upon the wheel contacting the runway and moves the steering system back to the first condition after a specified time after the wheel contacts the runway.

6 Claims, 3 Drawing Sheets

SYSTEM AND METHOD FOR LANDING A TAILLESS AIRCRAFT IN A CROSSWIND

BACKGROUND OF THE INVENTION

1. Field of the Invention

The invention relates to the field of aircraft and, in particular, to a system and method for landing an unmanned tailless or flying wing type aircraft in a crosswind.

2. Description of Related Art

Flying wing or tailless aircraft have a particularly unique problem. They have no vertical surfaces to provide a lateral force to control the effect of a crosswind during landings where the aircraft's flight path is at an angle to the longitudinal axis thereof. While the tailless aircraft can land flat, its wheels will strike the runway with a larger lateral offset than a conventional aircraft with vertical surfaces. The nose wheel is in front of the center of gravity (CG) and the side force generated by the wheel is very unstable. The offset in the angle means that when the aircraft touches down there will be a sudden lateral jerk in the direction the wheels are pointing. The resulting acceleration will cause one wing tip to dip or in a worst case, it can result in a ground loop.

U.S. Pat. No. 5,523,921 Aircraft Steering System And Method For Large Aircraft Having Main Landing Gear Steering During Low Taxi Speed While Nose Gear is Castored by H. C. Ralph discloses the concept of allowing the nose wheel to castor so that differential braking of the main landing gear can be used to turn the aircraft. The nose wheel landing gear includes a system to allow for turning with the nose wheel, but allows it to castor on command. The nose wheel steering system is described in Great Britain Patent No.: 879,279 Improvements Relating To Steering Mechanism For An Aircraft Ground Wheel Mounting by H. Cyril, et al. and is herein incorporated by reference.

Thus, it is a primary object of the invention to provide process to allow a tailless aircraft to land in a crosswind.

It is a further object of the invention to provide a process to allow a flying wing type aircraft to land in a crosswind by reducing the adverse effect at the moment of touchdown due to crabbing of the aircraft in a crosswind.

SUMMARY OF THE INVENTION

The invention is a method and system for landing a flying wing or tailless type aircraft on a runway in a crosswind. The aircraft includes a nose landing gear equipped with a steering system to steer the nose wheel that includes a control system to engage and disengage the nose landing gear wheel, and a main landing gear. The method includes the steps of:

1. Disengaging the nose landing wheel steering system upon impact with the runway so that it is free to castor; and 2. Engaging the nose wheel steering system after a specific time period after the nose wheel impacts the runway such that the nose wheel is steerable.

Preferably, the step of disengaging the nose landing wheel steering system upon impact with the runway so that it is free to castor includes the step of actuating a switch upon maximum contraction of the nose landing gear upon impact with the runway. Preferably, the step of actuating a switch upon maximum contraction of the nose landing gear upon impact with the runway includes the step of initiating a timing device to automatically reengage the nose landing gear steering system after the specific time period has passed. Furthermore, the step of engaging the nose wheel steering system after a specific time period after the nose wheel impacts the runway such that the nose wheel is steerable includes the step of deactivating a switch upon the nose landing gear returning from its maximum deflection upon impact with the runway.

The system includes a steering system for steering the nose wheel, the steering system having a first condition wherein it controls the angular position of the nose wheel and a second condition wherein the wheel is free to castor. The system also includes a control system for moving the steering system from the first condition to the second condition upon the wheel contacting the runway and to move the steering system back to the first condition after a specified time after the wheel contacts the runway.

The system further includes a position sensor mounted on the nose landing gear adapted to sense the initial compression of the nose landing gear upon touchdown on the runway and send an actuation signal to the steering system to cause the steering system to move to the second condition. Additionally, a timing device is incorporated to cause a second signal to be sent to the steering system to cause the steering system to return to the first condition after a specific period of time.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
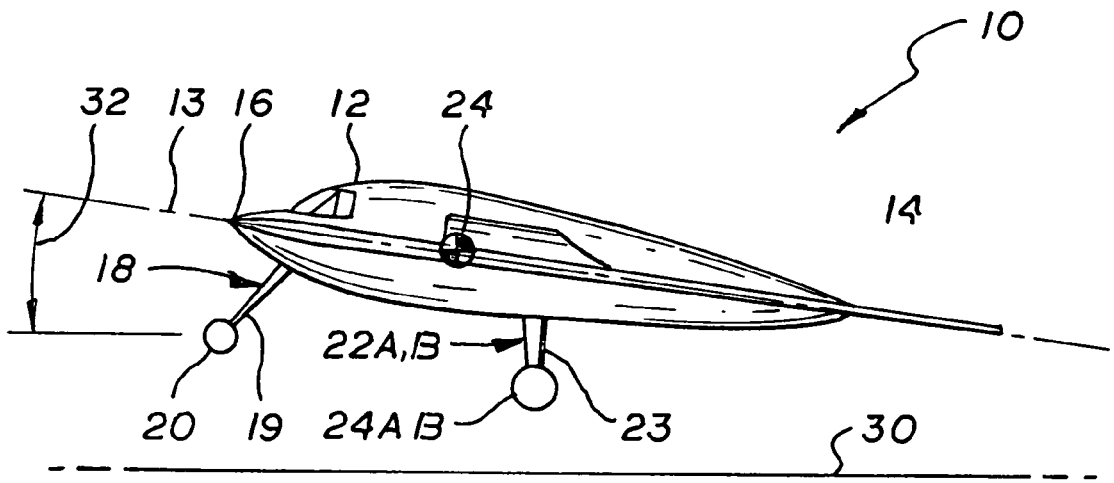
FIG. 1 is a side view of a flying wing aircraft approaching the runway with the nose gear landing gear fully extended.
Figure 2:
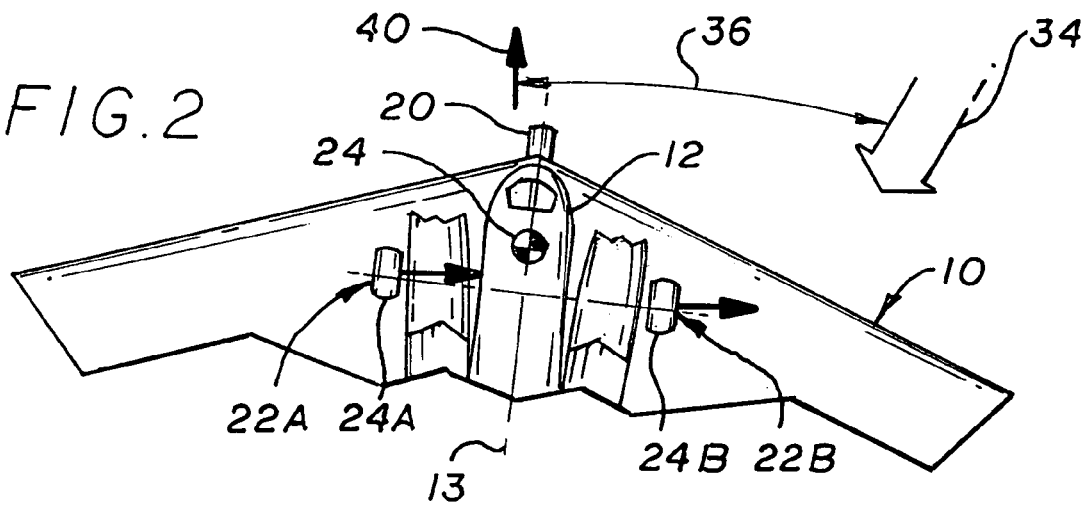
FIG. 2 is a top view of the aircraft shown in FIG. 1 landing in a crosswind, having a conventional nose landing gear.

Referring to FIG. 1 and, the tailless or flying wing aircraft, generally indicated by numeral 10, includes a center fuselage section 12 having a longitudinal axis 13, wing 14, and a nose 16 with an extended nose landing gear 18 having a shock strut 19 with wheel 20, and an extended main landing gears 22A and 22B with shock struts 23A and 23B with wheels 24A and 24B. The CG of the aircraft, indicated by numeral 24, lies between the nose 16 and main landing gear 22. The aircraft 10 is shown at a point just prior to landing on the runway 30 at an angle of attack, indicated by numeral 32.

Figure 4:
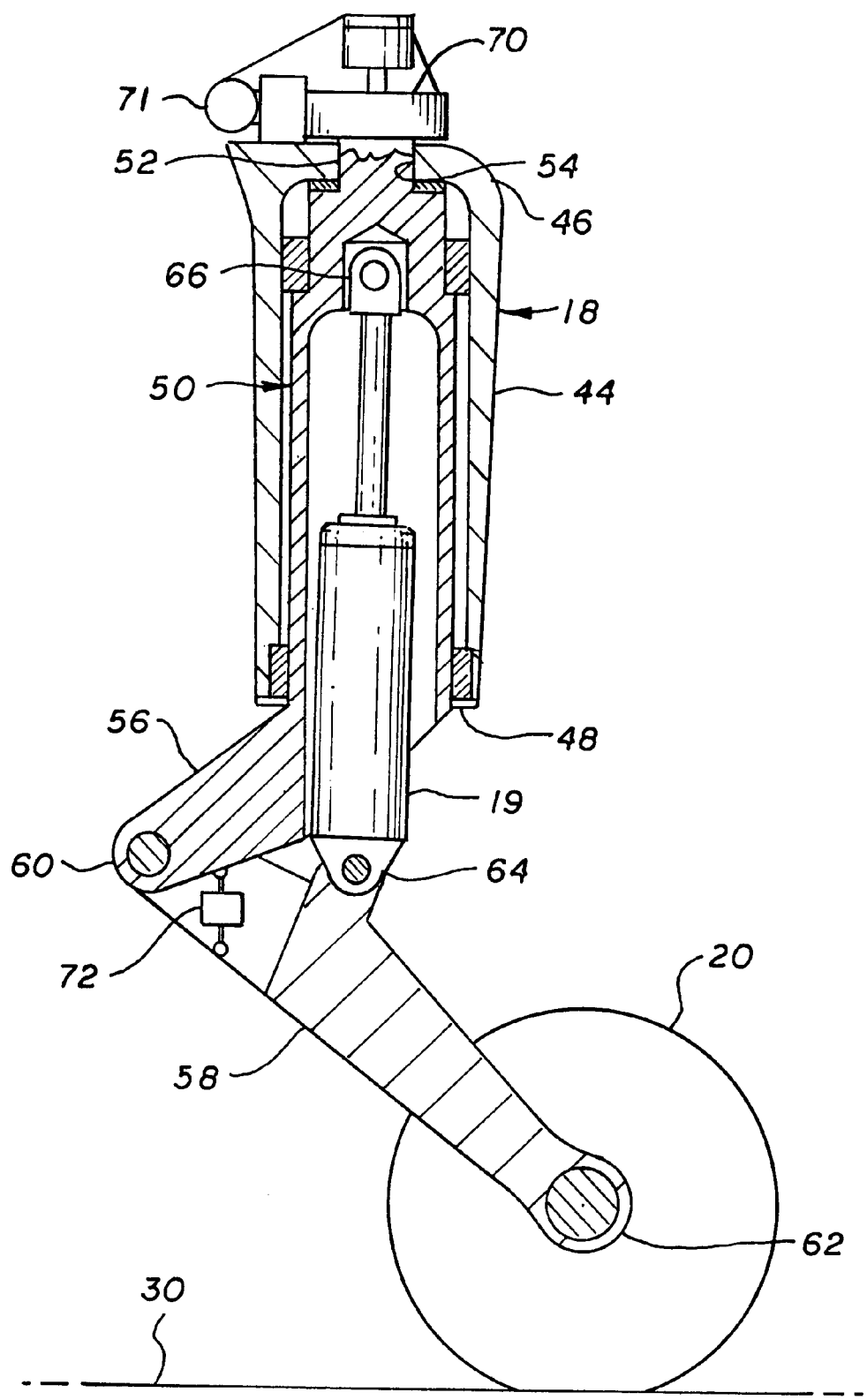
FIG. 4 is a cross-sectional view of the nose landing gear, which is a modified version of the landing gear disclosed Great Britain Patent No.: 879,279 Improvements Relating To Steering Mechanism For An Aircraft Ground Wheel Mounting by H. Cyril, et al.

FIG. 4 is a cross-sectional view of the nose landing gear, which is a modified version of the landing gear disclosed Great Britain Patent No.: 879,279 Improvements Relating To Steering Mechanism For An Aircraft Ground Wheel Mounting by H. Cyril, et al. aircraft such that one wing will dip and may strike the ground. It may even cause a ground loop.

Figure 3:
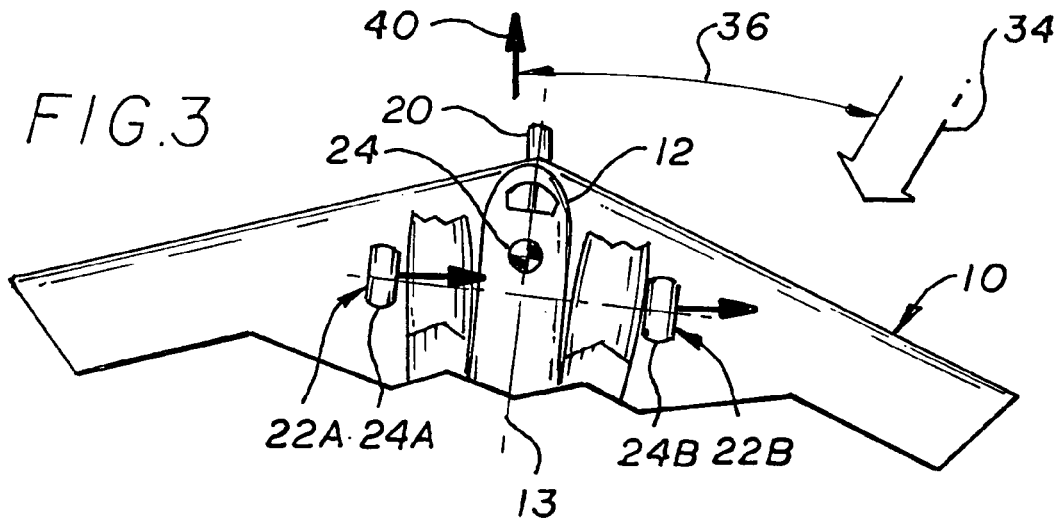
FIG. 3 is a top view of the aircraft shown in FIG. 1 landing in a crosswind incorporating the subject invention wherein the nose wheel is free to castor at touchdown.

Now referring to FIG. 3, with the nose wheel 20 free to castor, the above-described problem is eliminated. Now when the aircraft 10 touches down on the runway 30, the nose wheel 20 castors eliminating any gripping action that the nose wheel would otherwise produce. The main landing wheels 24A and 24B being behind the CG will automatically straighten the aircraft 10 out so faces the direction it is traveling which is directly down the runway 30.

To accomplish this action, a nose wheel assembly such as disclosed in described in Great Britain Patent No.: 879,279 Improvements Relating To Steering Mechanism For An Aircraft Ground Wheel Mounting by H. Cyril, et al. is used as modified as follows. Because the Cyril, et al. invention is fully described in the published patent only a general outline of that invention is provided herein and in FIG. 4. The landing gear 18 includes a housing 44 having a closed off first end 46 and open second end 48. Rotatably mounted within the housing 44 is a hollow steering member 50 having a reduced portion 52 extending through a hole 54 in the first end 46 of the housing 44 and a second end terminating in a crank portion 56. A lever 58 is connected by a first end 60 to the end of the crank portion 56 and by a second end 62 to the wheel 20 providing support therefore.

A shock strut 19 connects by a first end 64 to the lever 58 between the first end 60 and second end 62, and extends into the steering member 50 and is connected by its second end 66 thereto. Thus loads induced by the wheel 20 in contact with the runway 30 will cause the lever 58 to pivot about its first end 60 causing the shock strut 19 to compress and absorb loads. The reduced end 52 of the steering member 50 connects to a hydraulically actuated rack and pinion system 70 having a hydraulic control circuit 71. The system 70 is used to rotate the steering member 50 and thus the wheel 19. This rack and pinion system 70 can be switched to a condition wherein the steering member 70 is free to rotate upon demand. As previously stated the details of the system are fully discussed in the Cyril, et al. patent. The Cyril, et al. system is modified by the incorporation of a position sensor 72 mounted between the lever 58 and crank portion 56 that is designed to send a signal to a timing device 74 which in turn couples to the hydraulic control circuit 76.

Figure 5:
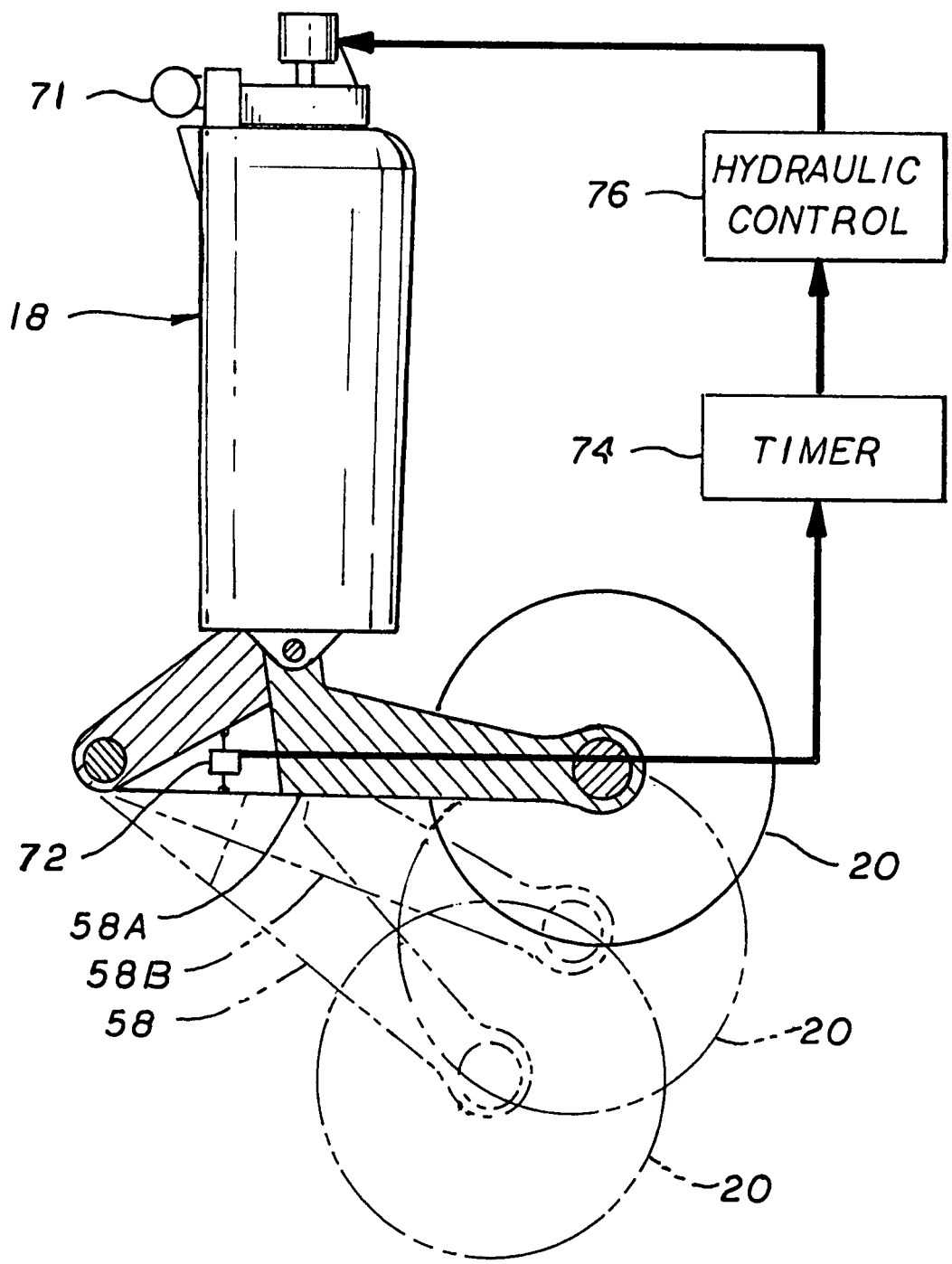
FIG. 5 is a semi-schematic view of the hydraulic circuit disclosed in Great Britain Patent No.: 879,279 Improvements Relating To Steering Mechanism For An Aircraft Ground Wheel Mounting by H. Cyril, et al.

Still referring to FIGS. 3-4 and additionally to FIG. 5, when the aircraft 10 lands on the runway 30, the initial contact of the wheel 20 with the runway will cause the lever 58 to rotate about its first end 60 to a maximum deflected position indicated by numeral 58A. This immediately causes the sensor 72 to move from a normally open position to a closed position and causing the timing device 74 to send a signal to the hydraulic control circuit 76 that allows the steering member 50 to freely rotate allowing the wheel 20 to castor. After some time delay, the timing device 74 then sends a second signal to the hydraulic control circuit 76 reinstating steering control. The time delay typically ranges from 1 to 3 seconds. Thereafter, the lever 58, now under normal aircraft loads, returns to a semi-compressed state indicated by numeral 58B at which points the sensor 72 returns to its normally open position.

In Applicants co-pending patent application Serial No.: 11/165,018 Process For landing A Tailless Aircraft, Filed June 2005, herein incorporated by reference, system is disclosed that makes use of a shock strut having rebound rate much slower than the compression rate. Thus, the shock strut were incorporated, there would be no need for a timing device. The sensor 72 can then be a switch that would sense the initial movement of the lever 58 and send a second signal when the shock strut returned to its normal partially compressed state wherein only the weight of the aircraft is absorbed.

The shock struts 19 of the nose landing gear 18 and the shock struts 23 of the main landing gears 22 are the key to the invention. The nose landing gear strut 19 is designed to have a shock return time greater than the shock struts 23.

Thus it can be seen that the use of the Cyril, et al. landing gear with the incorporation of a sensor 72, can eliminate the adverse effects caused by a non-castoring nose wheel when landing a flying wing or tailless type aircraft in a crosswind.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft manufacturing industry.

The invention claimed is:

1. A method of landing a flying wing type aircraft on a runway in a crosswind, the aircraft having a nose landing gear equipped with a steering system to steer the nose wheel that includes a control system to engage and disengage the nose landing gear wheel, and a main landing gear, the process comprising the steps of:
   disengaging the nose landing wheel steering system upon impact with the runway so that it is free to castor; and
   engaging the nose wheel steering system after a specific time period after the nose wheel impacts the runway such that the nose wheel is steerable.

2. The method of claim 1 wherein the step of disengaging the nose landing wheel steering system upon impact with the runway so that it is free to castor includes the step of actuating a switch upon maximum deflection of the nose landing gear upon impact with the runway.

3. The method of claim 2 wherein the step of actuating a switch upon maximum deflection of the nose landing gear upon impact with the runway includes the step of initiating a timing device to automatically reengage the nose landing hear steering system after the specific time period has passed.

4. The method as set forth in claim 3 wherein the step of engaging the nose wheel steering system after a specific time period after the nose wheel impacts the runway such that the nose wheel is steerable includes the step of deactivating a switch upon the nose landing gear returning from the maximum deflection upon impact with the runway.

5. A system for landing a flying wing type aircraft in a crosswind on a runway, the aircraft having a nose landing gear and main landing gear, the system comprising:
   a steering system for steering the nose wheel, said steering system having a first condition wherein it controls the angular position of nose wheel and a second condition wherein the wheel is free to castor; and
   an automated control system for sending an actuation signal to the steering system for moving said steering system from said first condition to said second condition upon the wheel contacting the runway and to move said steering system back to said first condition after a specified time after the wheel contacts the runway.

6. A system for landing a flying wing type aircraft in a crosswind on a runway, the aircraft having a nose landing gear and main landing gear, the system comprising:

a steering system for steering the nose wheel, said steering system having a first condition wherein it controls the angular position of nose wheel and a second condition wherein the wheel is free to castor;

a control system for moving said steering system from said first condition to said second condition upon the wheel contacting the runway and to move said steering system back to said first condition after a specified time after the wheel contacts the runway;

a position sensor mounted on the nose landing gear updated to sense the initial compression of the nose landing gear upon touchdown on the runway and send an actuation signal to said steering system to cause said steering system to change to said second condition; and timing means to cause a second signal to be sent to said steering system to cause said steering system to return to said first condition after a specific period of time.

* * * * *